Aug. 4, 1959　　D. J. CARLSON ET AL　　2,897,985
SELF-LOADING TRUCK

Filed Aug. 22, 1956　　7 Sheets-Sheet 2

INVENTORS
DAVID J. CARLSON
GERALD J. GEYER

BY
ATTORNEYS

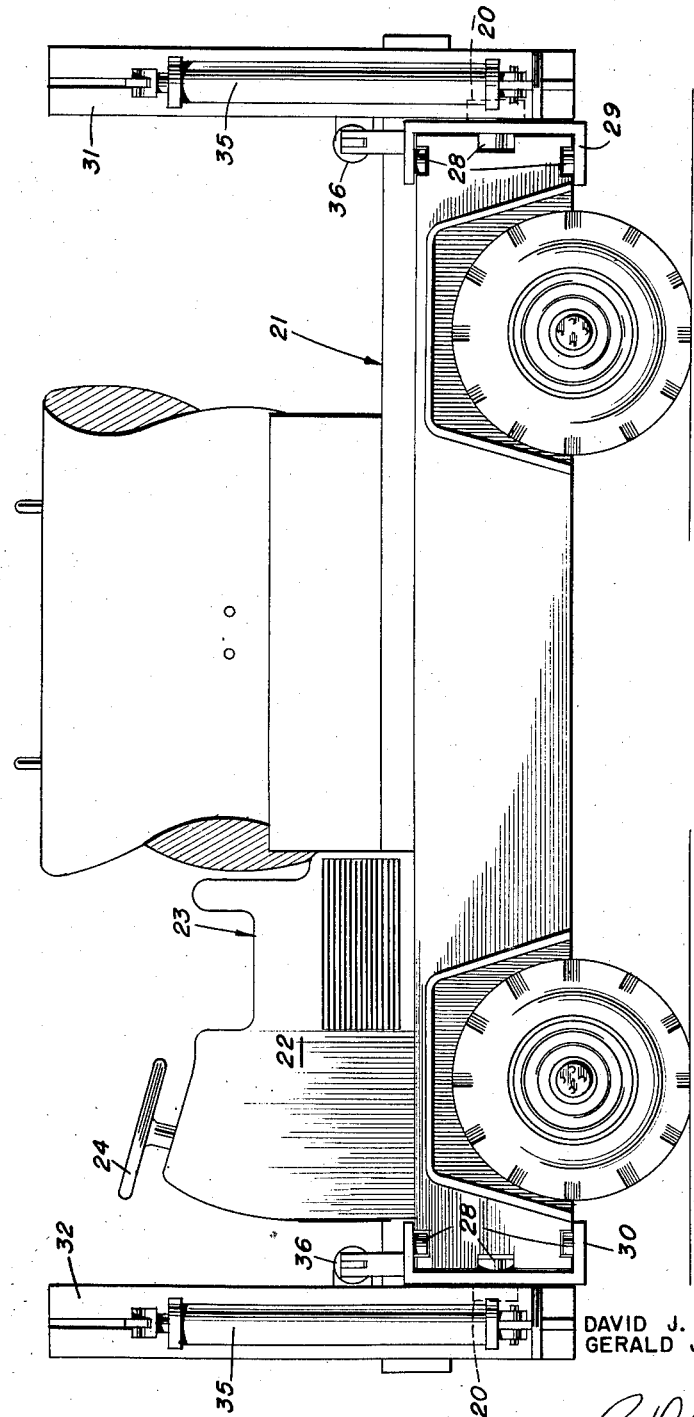

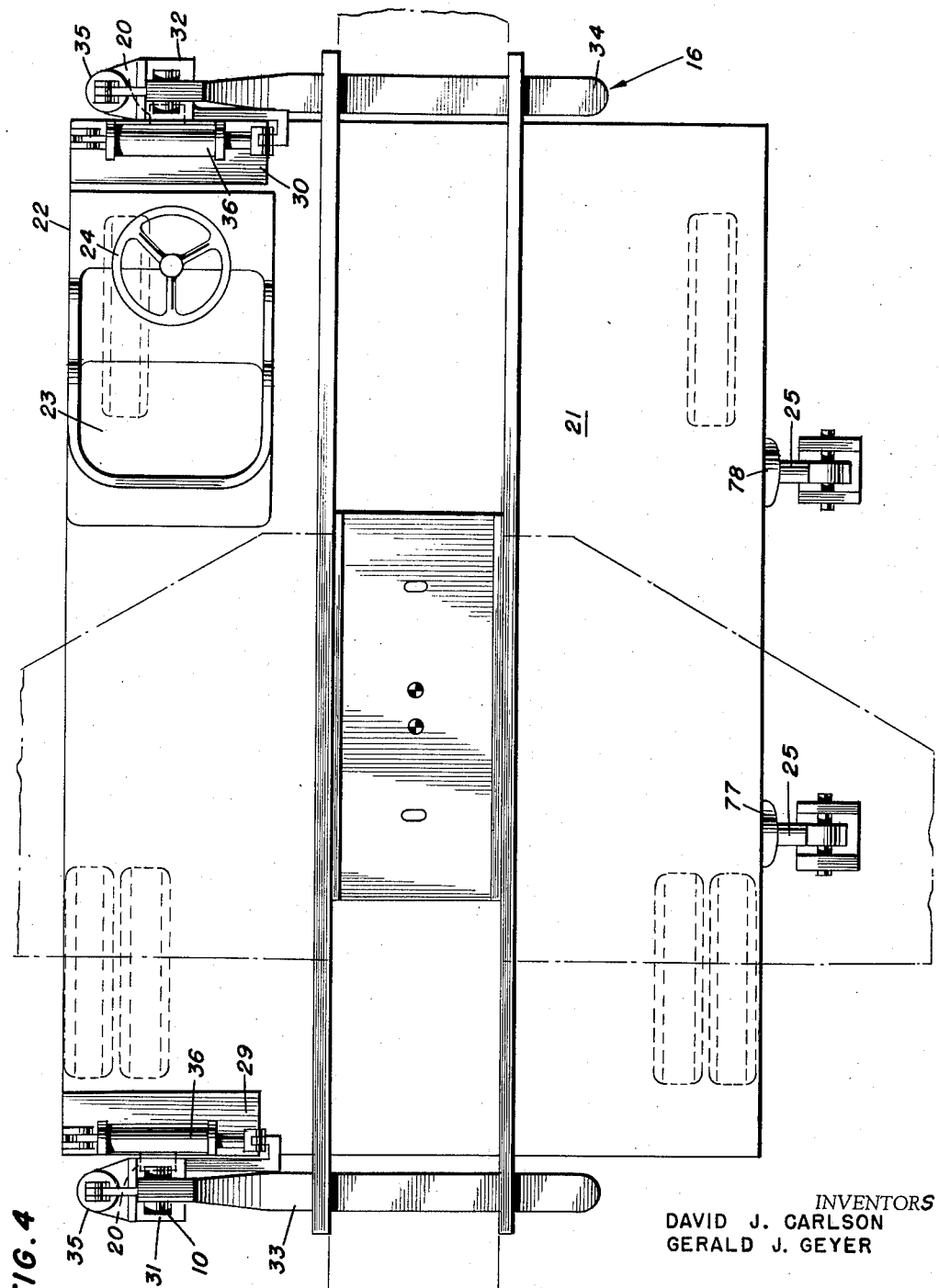

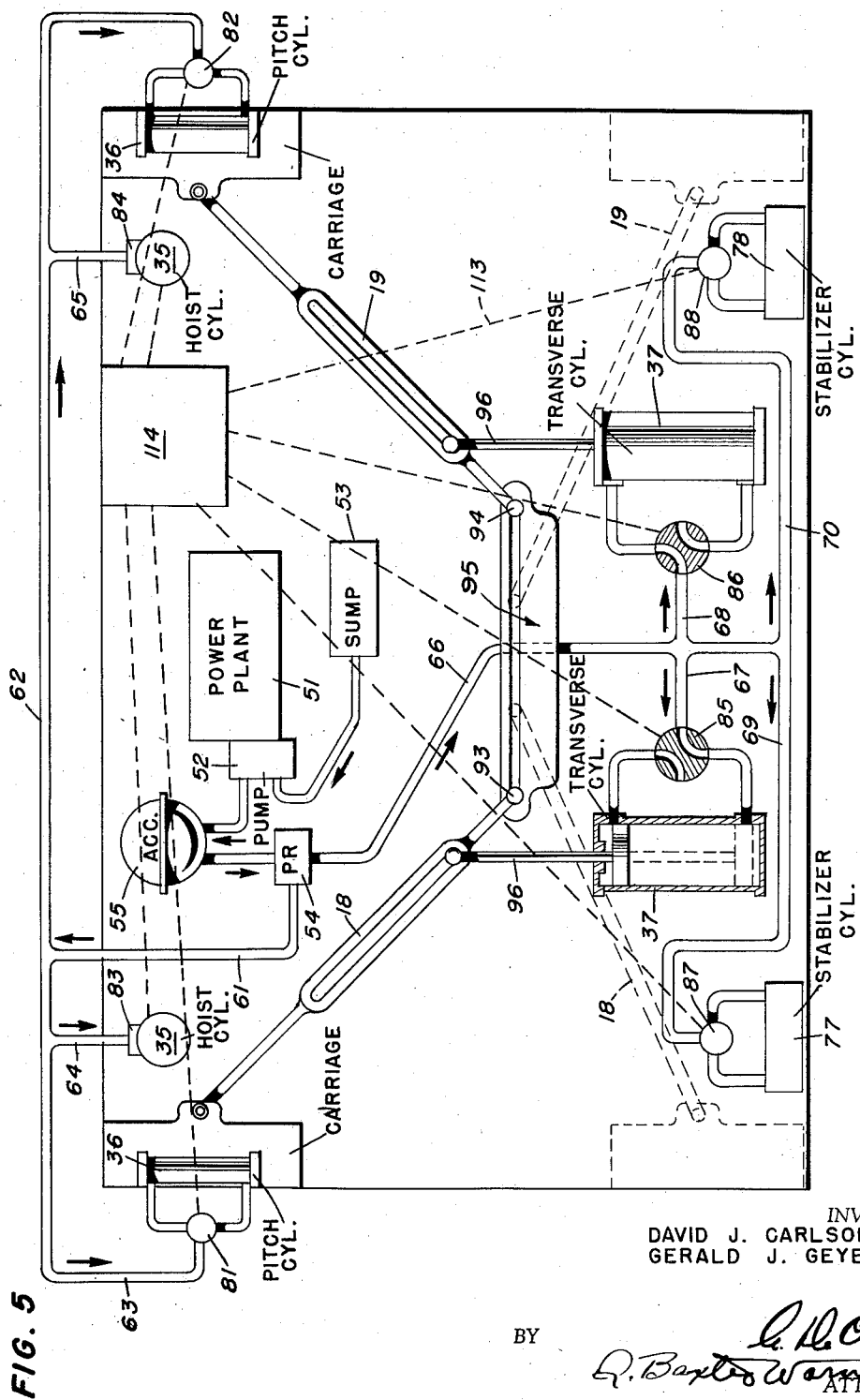

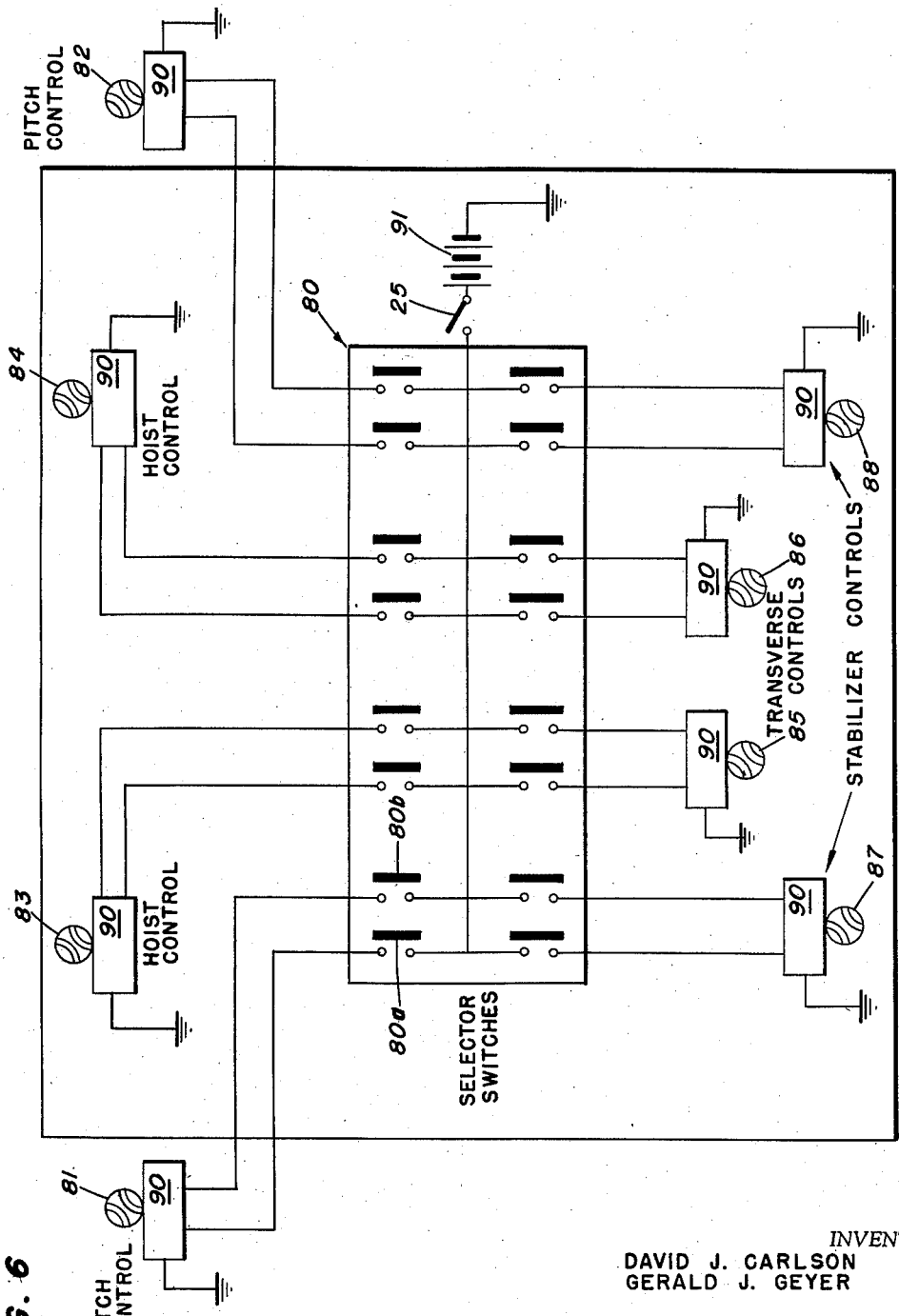

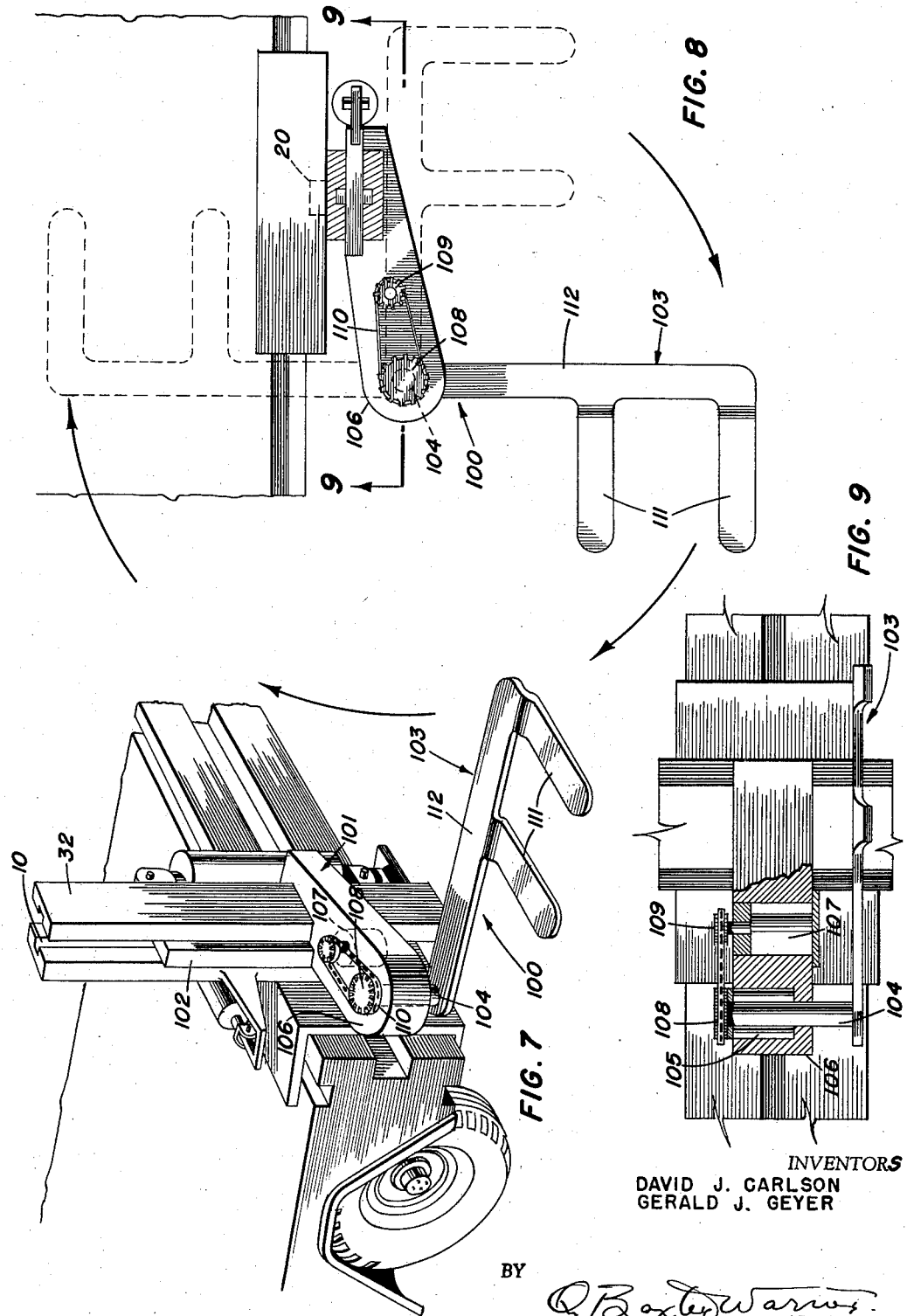

United States Patent Office 2,897,985
Patented Aug. 4, 1959

2,897,985

SELF-LOADING TRUCK

David J. Carlson, Vienna, and Gerald J. Geyer, Springfield, Va.

Application August 22, 1956, Serial No. 605,679

15 Claims. (Cl. 214—75)

(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of copending application Serial No. 368,020 for Self-Loading Truck, filed July 14, 1953.

The invention relates to material handling and transporting apparatus, and particularly to heavy duty trucks having power operated load engaging members mounted thereon and maneuverable conjointly or selectively to accomplish loading and unloading of cargo.

An object of the invention is to provide a lift truck or cargo handling truck of novel contour, with maximum adaptability to varying loading problems and situations.

Certain efforts have been made to equip heavy duty trucks with power loading mechanism by which cargo might be raised from a lower point alongside the bed of the truck, and then deposited on the truck bed. Many of these efforts have involved sacrifice of loading space, and some have involved sacrifice of structural stability and strength. Others have introduced complications that are highly expensive and render the truck difficult to operate and maintain.

Moreover, many of the conventional lift trucks are limited to but a single avenue through which cargo may be loaded onto the bed of the truck, and only one loading operation may take place in any one period of time. Thus, in effect, maximum loading conditions are not obtained from the potential afforded by a vehicle occupying the specific area.

The present invention overcomes the afore-mentioned disadvantages by the provision of a heavy duty lift truck or self-loading truck which is structurally strong and stable, easy to operate and maintain, and efficient and economical as a cargo handling vehicle, both because of the availability of practically the entire surface area of the truck for cargo storing purposes, and because of the separate loading assemblies which can carry out simultaneous independent or joint loading along the ends and the side of the truck bed. Further, due to the particular type of cargo handling arrangement provided, loading may be accomplished in narrow passageways or aisles limited only to the width of the truck.

Accordingly, an object of the invention is to provide a truck having extensive cargo receiving space in the form of an uninterrupted flat surface, running substantially the entire length and width of the truck body.

Another object is to provide a heavy duty truck having a generally box-like body, including a flat upper surface and straight vertically disposed sides and ends, with means provided on the end surfaces of the body to serve as tracks or guideways for transverse travel of the load engaging members to extended positions facilitating pick-up of the cargo, and for return transverse travel to facilitate depositing the cargo at the exact spot on the truck surface, that is considered most appropriate.

A further object is to provide power means for causing and controlling the transverse travel of the load engaging members, said power means being operable upon carriage mechanism movable along the end surfaces of the truck body; the load engaging members being integrated with the carriage mechanism.

Still another object is to provide such carriages with arms or prongs extending from vertically disposed towers which are rockably mounted on said carriages, whereby the arms or prongs may be tilted in a vertical plane for greater efficiency in handling cargo during delivery to or from the truck surface.

A further object of the present invention is to provide a material handling and transporting apparatus having an extensive horizontal area for the carrying and storage of cargo and associated universally mobile load engaging and carrying devices so mounted and operative in respect to said area that maximum loading and storage facilities are obtained.

Another object is to provide a heavy duty self-loading truck or lift truck whose upper body forms a large plane surface adapted to receive and store cargo, and separate independently operable loading devices slidably and pivotally mounted along each end of the body to present separate, versatile, mobile cargo handling stations that can maintain dual loading along the two ends or along one of the ends and a side of the truck body.

A still further object is to provide a cargo handling apparatus which provides the combination of two similar but separately controlled loading operations along the side, simultaneous conjointly or selective loading from along either of the ends and a side, and simultaneous conjointly or selective loading from the ends of the apparatus.

Another object is to provide a materials utility truck with independently controllable load engaging assemblies at each end thereof, each of said assemblies being slidably mounted for both vertical and transverse movement and pivotally mounted in both a horizontal and vertical plane for rotating and tilting movement.

Still another object is to provide a truck which can load and unload cargo from its own top area at either end thereof or simultaneously at both ends within the confines of a space limited only to the width of the truck.

A final object is to provide power means in association with such vertically disposed towers, for causing and controlling the lifting, lowering, tilting, and horizontal rotation of the load engaging members.

Other objects and many of the attendant advantages of this invention will be readily appreciated as the same becomes better understood by reference to the following detailed description when considered in connection with the accompanying drawings wherein:

Figs. 2, 3 and 4 are, respectively, end and side elevational views and a top plan view of the embodiment shown in Fig. 1;

Figs. 5 and 6 are schematic diagrams of hydraulic and electric circuits, respectively, for operation and control of components illustrated in Figs. 1 through 4;

Fig. 7 is a perspective view of a modified form of a load engaging assembly;

Fig. 8 is a top plan view of the modified load engaging assembly of Fig. 7 with dotted line positions to illustrate range of horizontal rotational movement; and Fig. 9 is a front elevational view of a truck with a portion broken away along a line substantially corresponding to line 9—9 of Fig. 8.

Figure 1:
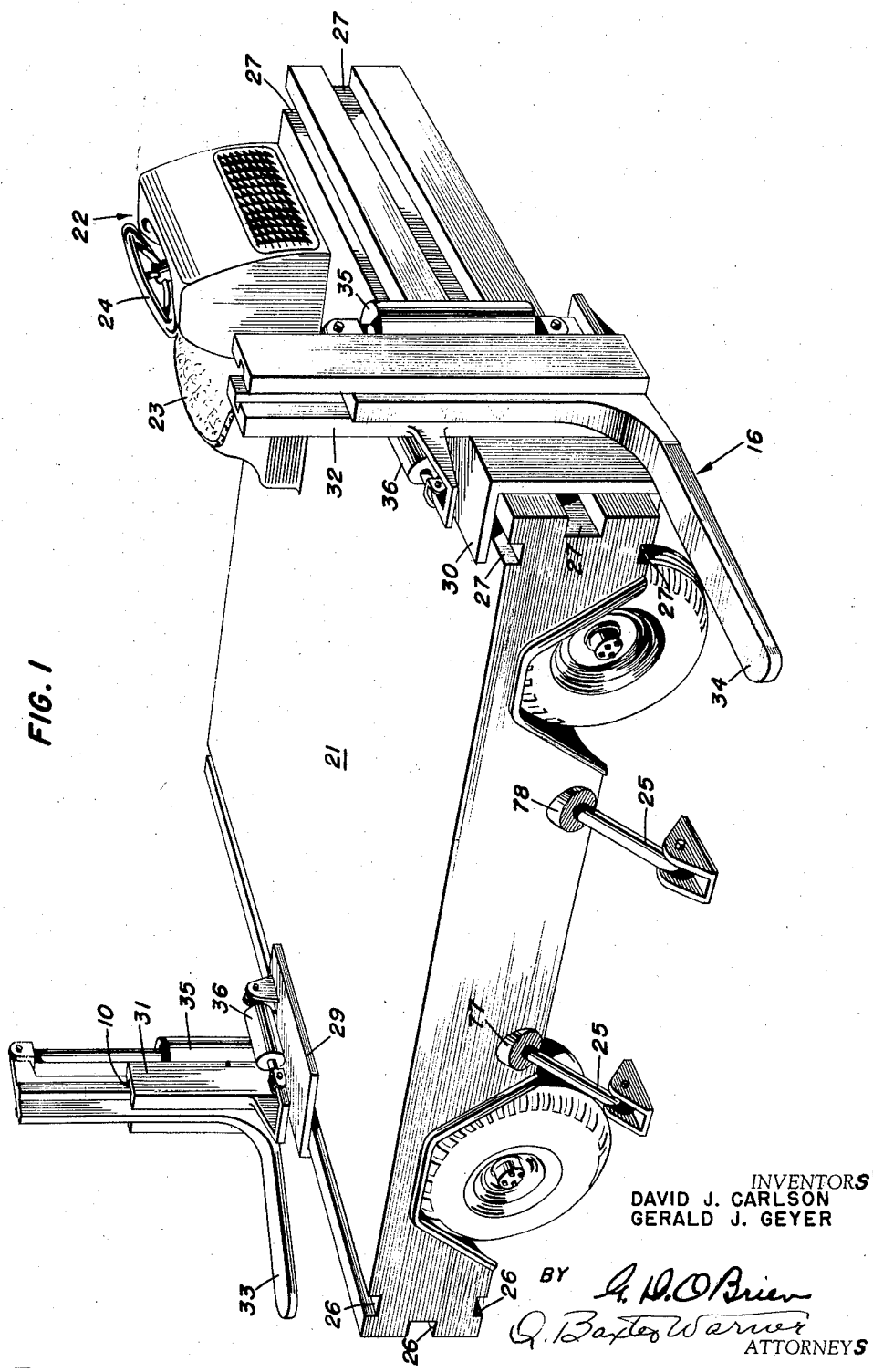
Fig. 1 is a perspective view of one embodiment of the invention.

Referring first to Fig. 1, the truck therein illustrated has a generally box-like contour, with a flat upper surface 21 extending all the way from front to rear, and from side to side, except for one front corner that is occupied by the operator's compartment 22 equipped with a seat 23, steering wheel 24, and a control panel including ignition switch 25 and other switches (see Fig. 6) for control of the application of hydraulic power to servo units to be described.

The front and rear walls of the truck, also the upper and lower truck surfaces adjacent said front and rear walls are recessed to provide transverse channels or tracks 26 and 27, extending from corner to corner of the truck, to receive rollers 28 (Fig. 3) mounted on carriages, or dollies 29 and 30, movable along the front and rear tracks 27 and 26, respectively, by tractive effort applied thereto by way of slotted links 18 and 19 (Fig. 5) connecting said carriages with servo units to be described.

Tower members 31, 32 having vertical slots or guideways 10 are pivotally mounted on the carriages 29, 30 by pivotable means such as trunnion bearings 20 for tilting movement in a vertical plane. Load engaging members 16 are slidably supported within the slots or guideways 10 of the towers and include horizontally extending lower arms or prongs 33, 34 which are adapted to engage and support material or cargo to be moved. The load engaging members may be raised or lowered by application of fluid pressure to pistons within the cylinder units 35 (Figs. 1 and 3) as determined by the actuation of remotely controlled valve means to be described. Correspondingly, the pistons within the cylinder units 36 control tilting of the towers 31 and 32 about trunnion bearings 20 (Figs. 2 and 3) on the respective carriages, and the pistons within cylinder units 37 (Fig. 5) control the horizontal traverse of the carriage, and of the towers mounted thereon; the carriages being movable in unison or separately, as desired.

Figure 2:
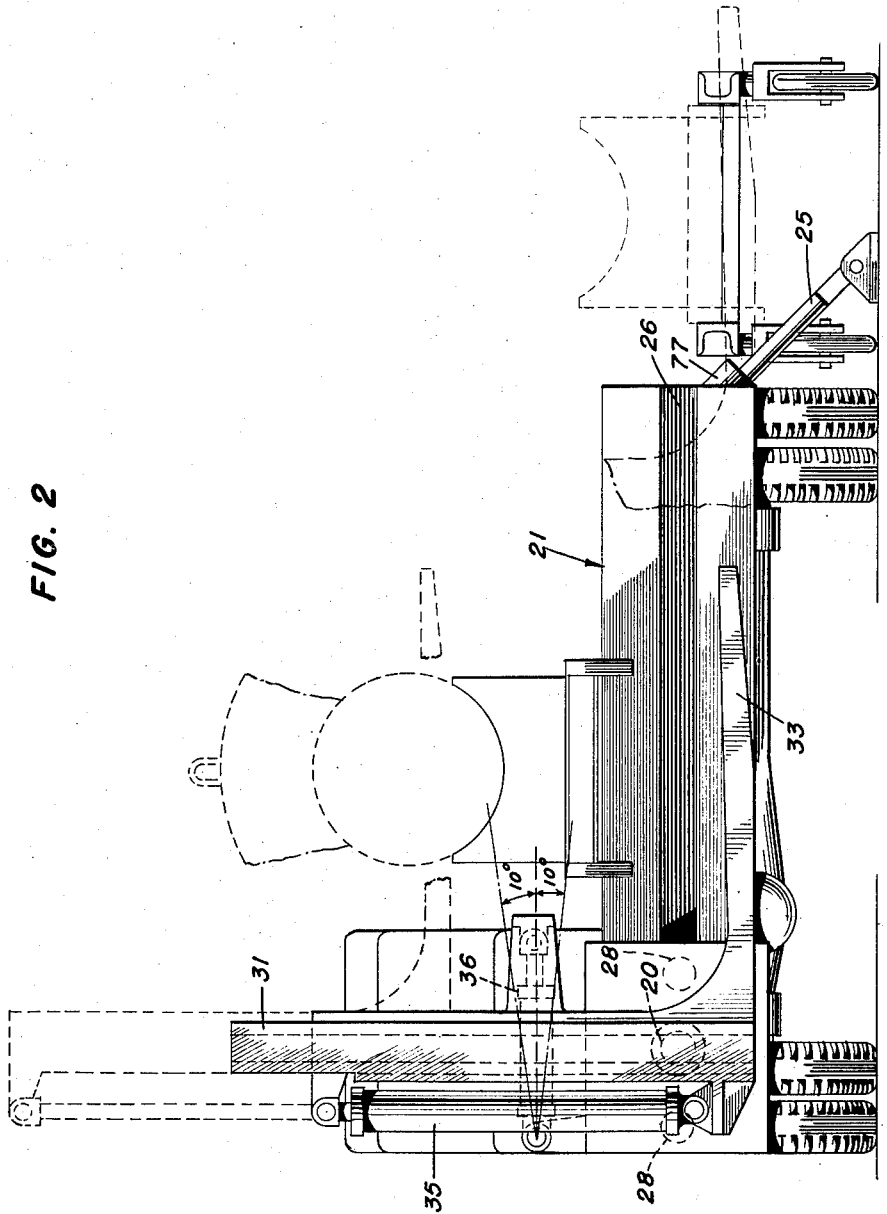

Fig. 2 shows in full lines a position of one arm intermediate the uppermost and lowermost positions thereof, and in dash lines the position to which the arm may be raised. Dash lines in Fig. 2 also indicate the extent of tilting of cylinder 36, and subsequently the arm member and the extent of horizontal traverse of one arm. Both arms, of course, may have the same range of maneuverability. All three motions (vertical, horizontal, and tilting) may be imparted in each loading and unloading operation, and may be in unison especially if the element to be loaded or unloaded is a long, heavy, article whose length is such as to span the space between the load engaging members.

The power plant 51 for the truck may be located approximately as shown in Fig. 5, and it may be the source of energy for the hydraulic system as well. In Fig. 5 the hydraulic system is shown as including a pump 52 driven from power plant 51 for supplying oil from source 53 to the fluid receiving servo units above mentioned, by way of pressure regulating valve assembly 54; there being also included an accumulator 55 for maintaining a pressure reserve. From the pressure regulator 54 fluid conduits 61 through 68 lead to the servo units constituted by the cylinder assemblies 35, 36 and 37 above described. Additional conduits 69 and 70 lead to the cylinder assemblies 77 and 78, respectively, controlling the retractable stabilizing braces 25.

It will be understood that the operator has (in his compartment 22) remote control selector switches as shown at 80 (Fig. 6) by which he may selectively operate directional valves 81 through 88, in any sequence or concurrently, and thereby direct pressure fluid from the corresponding lines of the 61 through 70 group, into the corresponding servo cylinders; a return flow from the valves back to the sump 53 being also provided, by way of return conduits not fully illustrated in Fig. 5. Individual solenoids 90 (Fig. 6) perform the actual valve shifting when energized from source 91 under the control of the appropriate selector switches 80. For example, if switch 80a is closed the solenoid 90 will cause valve 81 to shift or rotate such that the fluid under pressure will be admitted to one end of cylinder 36 (Fig. 5) and the other end will be opened to the sump thus imparting a tilting movement or motion to tower 32. When switch 80a is reopened valve 81 will be returned to a neutral or no-flow position by spring means (not shown) and the tower will be retained in its particular tilted position by virtue of the fluid pressure contained on both sides of the piston. Similarly, if switch 80b is closed, solenoid 90 will rotate valve 81 in the other direction, the fluid will enter the opposite end of cylinder 36 and the tower will accordingly be tilted in the reverse direction. The above operation is the same for each of the remaining solenoid-valve combinations for obtaining transverse and vertical movements.

It is to be understood that the above illustrates only one type of system which can be employed for operation of the components. Other systems may be utilized such as the mechanical arrangement shown in Fig. 5 wherein through means of mechanical linkages 113, operatively connected to each valve and controlled from central control station 114 located in adjacent compartment 22, each of the respective valves 81—88 may be moved from a neutral no-flow position to either of two power positions. In regard to the hoist cylinder 35, the positions would be up or down and the valve passages would accordingly be so disposed as to permit fluid flow to the lower end of cylinder 35 in the first or up position and to the top portion of the cylinder in the latter position.

When the arm or prong members are being applied to a load of elongated contour, they will of course be successively lowered, raised, shifted transversely, and tilted in unison. On the other hand, either arm or prong may be lowered, raised, shifted or tilted independently of the other, or to a greater or lesser degree than the other, in order to "skew" the load with respect to the longitudinal axis of the truck, or tilt it for forward or rearward inclination with respect to the surface of the truck, as may be desired.

As shown in Fig. 5, the inner pivot bearings 93 and 94 of the links 18 and 19, respectively, are slidable in the slotted portion of a yoke 95 secured to the truck chassis, and piston rods 96 slide correspondingly in the slots of links 18 and 19, as the latter are swung about their pivots 93 and 94 in response to fluid pressure application to the inner chambers of cylinders 37, to move the piston rods downwardly, as viewed in Fig. 5. In actual practice, of course, the cylinders and piston rods will be disposed horizontally, that is, parallel to the truck surface 21, and beneath said surface. On the other hand, equivalent carriage traversing means differing from the linkage 18 and 19 may be substituted; for example, a system of gears engageable with racks secured to the respective carriages.

Figs. 7 through 9 illustrate a modified load engaging assembly wherein the assembly, generally indicated by numeral 100, comprises a horizontally extended support member 101 which is rigidly secured to the vertical slider 102 and adapted to move vertically therewith by means of guideway 10 within tower 32 in the manner previously described. The tower structure and its mounting and operation is the same as that shown in Figs. 1 through 6. A load engaging member 103 is pivotally mounted by pinion 104, and bearing 105 on the outer or forward end 106 of the support member 101, and is rotatable in a horizontal plane by virtue of suitable power and transmission means such as electric motor 107, sprockets 108, 109 and chain drive 110. Spaced parallel arms or prongs 111 are projected from the end portion of extension arm 112 of the loading engaging member 103, the spaced arms or prongs extending outwardly from the extension arm in substantially normal relationship thereto. The electric motors 107 (one for each load engaging assembly) are each separately connected to power plant 51 by conventional wiring (not shown) such that rotation of the load engaging members 103 (one on each end of the truck) can be controlled from the operator's compartment 22 by conventional switch means and rotated individually or in unison.

As shown in Fig. 8 each of the load engaging members 103 can be rotated a full 270° around pinion 104, in addition to the traverse, tilting and vertical movement disclosed in Fig. 2. Thus, with the universal type of mounting arrangement provided for each load engaging assembly, cargos may simultaneously be loaded directly over the ends of the truck, or separate or joint loading operations may be carried out along a side of the vehicle. From the foregoing it will be seen that the self-loading truck, or lift truck, affords many useful variations and combinations of loading arrangements and is particularly adaptable and versatile in confined areas which, in many instances, is the natural environment for such type of vehicles.

Obviously many modifications and variations of the present invention are possible in the light of the above teachings. It is therefore to be understood that within the scope of the appended claims the invention may be practiced otherwise than as specifically described.

What is claimed is:

1. A material handling apparatus comprising a box-like body having a flat upper surface of uniform level over substantially its entire upper surface, vertical end walls terminating at said upper surface, guide means extending along each of said vertical end walls, a carrier slidably disposed within each of said guide means, power means for moving said carriers along said guide means, tower members pivotally mounted on each of said carriers for tilting movement in the vertical plane, each of said towers having vertical slots formed therein, a load engaging device slidably seated within each of said slots, each of said load engaging devices including a horizontal extension, and an arm pivotally mounted at the outer end of said extension for rotatable movement in a plane substantially parallel to said flat upper surface, power means for selectively tilting each of said towers, power means for selectively raising and lowering each of said load engaging devices, and power means for selectively rotating each of said arms in respect to said extensions.

2. Load handling equipment comprising, a platform having a substantially large cleared area to receive a load thereon, a load transporting means mounted substantially laterally adjacent the periphery of the platform, said means including a load engaging member, a first means for pivotally and slidably connecting load engaging member to said platform for permitting rotation of and linear movement of the load engaging member in a first plane of movement, and a second means for pivotally and slidably connecting said load engaging member to said platform for permitting rotation of and linear movement of the load engaging member in a second plane of movement, said second plane of movement being substantially normal to the first plane of movement.

3. A load handling apparatus comprising, a load engaging member mounted for rotative movement and lifting movement, support means for said member mounted for lateral movement and rotative movement, means for imparting load lifting motion to said load engaging member, means for imparting rotative movement to said member, means for imparting a lateral movement to said support, means for imparting a rotative movement to said support, and a platform adjacent the path of movement of said load engaging member whereby a load engaged at a point remote from the platform may be transported to and deposited on said platform.

4. The apparatus of claim 3 wherein said load engaging member includes spaced substantially parallel prongs.

5. A load handling apparatus comprising, a load engaging arm mounted for rotative movement and lifting movement, a platform adjacent the path of movement of said arm, support means for said arm, said support means being secured to one end of said platform for lateral sliding movement and rotative movement thereto, means for imparting lifting movement to said arm, means for imparting rotative movement to said arm, means for imparting lateral movement to said support, and means for imparting rotative movement to said support.

6. A load handling apparatus comprising, load engaging arms mounted for rotative movement and lifting movement, a platform adjacent the path of movement of said arms, support means for each of said arms, said support means being secured to each end of said platform, and each of said support means supporting its respective arm for lateral sliding movement and rotative movement in relationship to said platform, means for imparting lifting movement to said arms, means for imparting rotative movement to said arms, means for imparting lateral movement to said supporting means, and means for imparting rotative movement to said support means.

7. A load handling apparatus comprising, a platform having a large cleared area to receive a load thereon, a load transporting means mounted substantially laterally adjacent to and external of the periphery of said platform, said load transporting means including a carriage mounted for transverse movement along an edge of said platform, and a tower having vertical guide means, said tower being pivotally attached to said carriage for relative tilting movement in a vertical plane, a horizontal support member slidably seated within the guide means for vertical movement along said tower, a load engaging member rotatably mounted on said horizontal support member for angular movement in a plane substantially parallel to said platform, means for imparting transverse movement to the carriage, means for imparting tilting movement to the tower, means for imparting vertical movement to the horizontal support member, and means for imparting rotatable movement to said load engaging member whereby a load engaged at a point remote from the platform may be transported to, and deposited on, said platform and the subsequent reverse procedure.

8. An apparatus for loading and storing material comprising, a platform, a load handling and transporting means mounted substantially laterally adjacent to and external of the periphery of said platform and movable transversely along the platform, a load engaging member operatively connected to said load handling and transporting means, said last-named means including compound rotatable means for multiangular displacement of said load engaging member in respect to said platform, actuating means pivotally connected to said load handling and transporting means and slidably connected to the platform for moving the load handling and transporting means transversely along the platform in response to operation of said actuating means, and power means connected to said actuating means and fixed to the platform for operating said actuating means.

9. A load handling apparatus comprising, a platform having a large cleared area to receive a load thereon, a load transporting means mounted substantially laterally adjacent to and external of the periphery of said platform, said load transporting means including a carriage mounted for transverse movement along an edge of said platform, and a tower having vertical guide means, said tower being pivotally attached to said carriage for relative tilting movement in a vertical plane, a horizontal support member slidably seated within the guide means for vertical movement along said tower, a load engaging member rotatably mounted on said horizontal support member for angular movement in a plane substantially parallel to said platform, means for imparting transverse movement to the carriage, means for imparting tilting movement to the tower, means for imparting vertical movement to the horizontal support member, and means for imparting rotatable movement to said load engaging member and wherein said load engaging member comprises a pair of spaced substantially parallel prongs adapted to be rotated through an angle of substantially 270°.

10. A load handling apparatus comprising, a platform having a large cleared area to receive a load thereon, a load transporting means mounted substantially laterally adjacent to and external of the periphery of said platform, said load transporting means including a carriage mounted for transverse movement along an edge of said platform, and a tower having vertical guide means, said tower being pivotally attached to said carriage for relative tilting movement in a vertical plane, a horizontal support member slidably seated within the guide means for vertical movement along said tower, a load engaging member rotatably mounted on said horizontal support member for angular movement in a plane substantially parallel to said platform, means for imparting transverse movement to the carriage, means for imparting tilting movement to the tower, means for imparting vertical movement to the horizontal support member, and means for imparting rotatable movement to said load engaging member, and wherein said load engaging member comprises an extension arm having a pair of spaced substantially parallel prongs secured to the end portion thereof, said prongs being disposed in a position substantially normal to the longitudinal center line of the extension arm, said load engaging member being adapted to rotate through an angle of 270°.

11. The apparatus set forth in claim 1, wherein power means provided for said arm pivotally mounted at the outer end of said extension for rotatable movement in a plane substantially parallel to said flat upper surface is capable of rotating said arm in said plane up to 270°.

12. A material handling apparatus comprising a body having a substantially level flat upper load carrying surface, vertical walls terminating at said upper surface, guide means extending along at least two of said vertical walls, a carrier slidably disposed within each of said guide means, power means for moving said carriers along said guide means, tower members pivotally mounted on each of said carriers for tilting movement in the vertical plane, each of said towers having vertical slots formed therein, a load engaging device slidably seated within each of said slots, each of said load engaging devices including a horizontal extension, and an arm pivotally mounted at the outer end of said extension for rotatable movement in a plane substantially parallel to said flat upper surface, power means for selectively tilting each of said towers, power means for selectively raising and lowering each of said load engaging devices, and power means for selectively rotating each of said arms in respect to said extensions.

13. A material handling apparatus comprising a body having a substantially level flat upper load carrying surface, vertical walls terminating at said upper surface, a plurality of lifting forks mounted on said vertical walls for transferring loads to and from said load carrying surface, each of said lifting forks being provided with means to make it capable of simultaneous transverse, tilting and vertical movement, and at least one of said forks having means to make it capable of simultaneous rotatable movement in a plane substantially parallel to said flat upper surface.

14. A material handling apparatus comprising a body having a substantially level flat upper load carrying surface, vertical walls terminating at said upper surface, a plurality of lifting forks mounted on said vertical walls for transferring loads to and from said load carrying surface, each of said lifting forks being provided with means to make it capable of transverse, tilting and vertical movement, and at least one of said forks having means to make it capable of rotatable movement in a plane substantially parallel to said flat upper surface.

15. A self-loading cargo truck comprising a flat platform for carrying cargo and loading assemblies on remote sides of said platform for loading cargo onto said platform, said loading assemblies each including first means for lifting cargo, second means for moving cargo transversely of said platform, third means for tilting cargo in a plane perpendicular to said platform and means for controlling said first, second and third means in unison or independently of each other and a fourth means for rotating cargo in a plane parallel to said platform.

References Cited in the file of this patent

UNITED STATES PATENTS

| 2,563,514 | Brosamer | Aug. 7, 1951 |
| 2,621,811 | Lull | Dec. 16, 1952 |
| 2,709,017 | Ulinski | May 24, 1955 |
| 2,720,993 | Lull | Oct. 18, 1955 |
| 2,753,066 | Arnot | July 3, 1956 |
| 2,773,612 | West et al. | Dec. 11, 1956 |
| 2,773,614 | Edwards et al. | Dec. 11, 1956 |
| 2,823,813 | Shimmon | Feb. 18, 1958 |

FOREIGN PATENTS

| 615,281 | Great Britain | Jan. 4, 1949 |
| 1,114,140 | France | Dec. 12, 1955 |